No. 634,231. Patented Oct. 3, 1899.
L. A. DIXON.
ELECTRIC BELT.
(Application filed June 6, 1899.)
(No Model.)
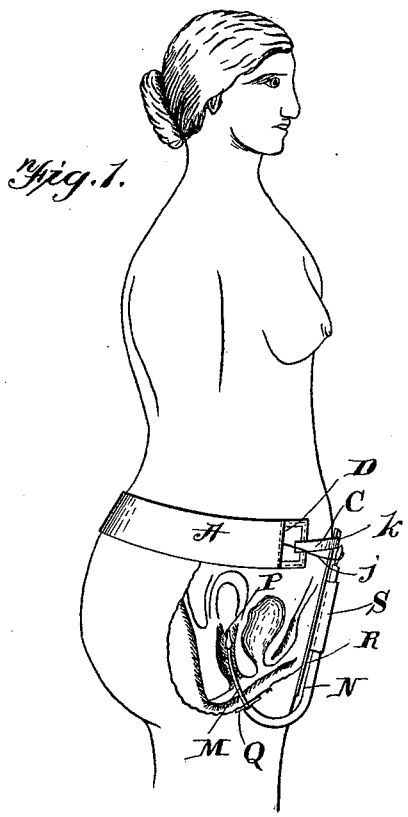
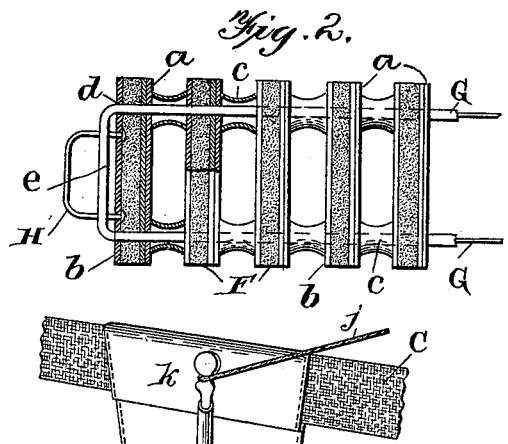
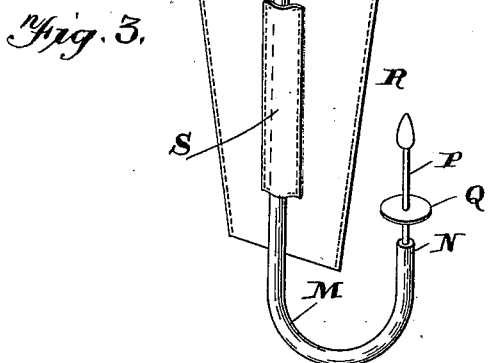
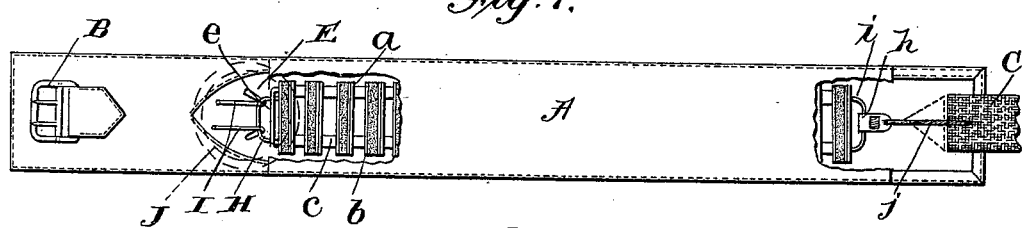
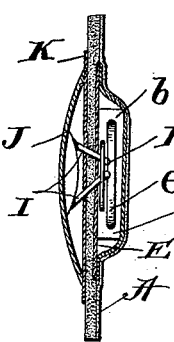
Witnesses
Geo. E. Drech
M. P. Evans
Inventor
Lester A. Dixon
by
Samuel N. Evans
Attorney
THE NORRIS PETERS CO., PHOTO-LITHO., WASHINGTON, D. C.

UNITED STATES PATENT OFFICE.

LESTER A. DIXON, OF MARSHALL, MICHIGAN, ASSIGNOR TO ANDREW CHRYSTAL, OF SAME PLACE.

ELECTRIC BELT.

SPECIFICATION forming part of Letters Patent No. 634,231, dated October 3, 1899.

Application filed June 6, 1899. Serial No. 719,566. (No model.)

*To all whom it may concern:*

Be it known that I, LESTER A. DIXON, a citizen of the United States, residing at Marshall, in the county of Calhoun and State of Michigan, have invented certain new and useful Improvements in Electric Belts, of which the following is a specification.

My invention relates to improvements in electric belts, and pertains to a belt constructed as hereinafter shown and described.

The objects of my invention are to provide an improved electric belt in which the battery is simple and cheap, which is so constructed that the battery can be quickly and readily attached to and detached from the belt, and in which the sounding-rod that constitutes one pole of the battery can be horizontally and vertically adjusted to suit the pleasure and comfort of the wearer.

In the accompanying drawings, Figure 1 is a view showing my invention applied to the body of the wearer. Fig. 2 is an enlarged detached view of a portion of the battery, showing its detail of construction. Fig. 3 is a detached perspective view of the sounding-rod and its supporting-slat. Fig. 4 is a plan view of the belt, showing the battery in position therein. Fig. 5 is a sectional view through one end of the back, showing the stationary pole of the battery carried thereby.

Referring now to the drawings, A is a belt made of felt or other suitable material, which carries at one end a buckle B and at its opposite end a long strap C, which is preferably composed of elastic material and by means of which the belt is fastened around the waist of the wearer. At the outer side of the belt I form an open-ended longitudinally-extending battery-pocket D, and this pocket is furnished with a waterproof lining E for the purpose of keeping the current-generating liquid carried by the pads or absorbent material of the battery from being absorbed by the belt and thereby carried in contact with the body of the wearer.

The battery consists of a plurality of oblong cells F, each of which is composed of one or more oblong zinc plates $a$ and one or more correspondingly-shaped copper plates $b$, and situated between the copper and the zinc plates is a strip of felt or other absorbent material for absorbing an acid-current-generating fluid. Placed between each cell and in electric contact with the zinc plates of one cell and the copper plates of an adjacent cell are the tubular conductors $c$. These cells and the parts constituting each cell are simply and yet effectively held in place by means of an insulating-wire G, which passes through perforations $d$ in the ends of the plates and through the tubular connections between the cells, and this connecting-wire may be composed of a single piece by doubling it at one end, as shown at $e$, or two separate pieces can be used, if desired, for holding the cells in position, as will be readily understood. A battery constructed as above described is simple and cheap and the cells can be readily renewed.

Attached to one pole of the battery, at one end thereof, is a U-shaped loop H, adapted to be hooked over the wire connection I, which passes through the belt at one end of the battery-pocket and which may be readily unhooked therefrom when it is desired to remove the battery from its pocket. This wire I is connected with a flat conductor J, carried at the opposite and inner side of the belt and which is adapted to be in contact with the body of the wearer when the belt is in position, and situated between the conductor J and the belt is a disk K, made of rubber or other insulating material. The other conductor M, which is placed in contact with the body for forming a circuit with the conductor J through the body of the wearer, is J-shaped in side elevation, as illustrated, and is provided with an insulating-covering in the form of a rubber tube N throughout its length, with the exception of its inner end P, which is intended to complete the circuit from the conductor J through the body of the wearer to the conductor M. This J-shaped conductor M may be termed a "sounding-rod" and is preferably provided with a flexible rubber disk Q, situated a short distance below its end P.

The conductor M is supported by a flap R, formed of felt or other material, by means of a vertical pocket S, through which the stem of the conductor M passes and is readily vertically adjustable to suit the convenience of the wearer and will be held in its vertical adjustment by the friction contact of its rubber insulating-covering with the inner side of the vertical pocket through which the stem passes. Attached to the stem of this conductor M is a flexible electric conductor *j* of the usual construction, and the opposite end of this flexible conductor is detachably connected with the opposite pole of the battery and at the opposite end thereof from the conductor J by means of a spring-clasp *h*, the said spring-clasp adapted to embrace a U-shaped wire *i*, connected with the battery in any desired manner. The upper end of the flap R is provided with a transverse pocket *k*, through which the long strap passes, and this flap is horizontally adjustable upon the strap for carrying it to the proper position upon the body of the wearer, as will be readily understood. By means of this construction the conductor M is horizontally and vertically adjustable, which will enable the wearer to adjust it to the proper position for comfort.

An electric belt constructed as herein shown and described is especially adapted for certain diseases and is very convenient in the way of its adjustment to suit the convenience and comfort of the wearer, as well as being simple, cheap, and effective.

Having thus described my invention, what I claim, and desire to secure by Letters Patent, is—

1. An electric belt comprising a belt, a battery carried thereby, the belt having a conductor in electric contact with one pole of the battery, a depending flap carried by the belt, and a vertically-adjustable second conductor adapted to be placed in contact with the body of the wearer, and a connection between the second conductor and the opposite pole of the battery, substantially as described.

2. An electric belt comprising a belt, a battery carried thereby, a depending and horizontally-adjustable flap, a J-shaped conductor vertically movable upon the flap, a connection between the J-shaped conductor and one pole of the battery, and a second conductor adapted to be in contact with the body of the wearer, and in electric connection with the opposite pole of the battery, substantially as described.

3. An electric belt comprising a belt having at one end a buckle, a battery carried thereby, the opposite end of the belt having an elongated strap for engagement with the buckle, and a depending flap having a traverse-pocket at its upper end through which the elongated strap freely passes, the flap having a vertical pocket, and a conductor vertically movable upon the said flap, substantially as described.

In testimony whereof I affix my signature in presence of two witnesses.

LESTER A. DIXON.

Witnesses:
Y. A. B. EVANS,
M. E. LABERTEAUX.